United States Patent
Borrowman

(10) Patent No.: US 7,415,476 B2
(45) Date of Patent: Aug. 19, 2008

(54) DIGITAL FILE MANAGEMENT AND IMAGING SYSTEM AND METHOD INCLUDING SECURE FILE MARKING

(75) Inventor: Colin D. Borrowman, Schenectady, NY (US)

(73) Assignee: Authentidate Holding Corp., Berkeley Heights, NJ (US)

( * ) Notice: Subject to any disclaimer, the term of this patent is extended or adjusted under 35 U.S.C. 154(b) by 463 days.

(21) Appl. No.: 10/385,291

(22) Filed: Mar. 10, 2003

(65) Prior Publication Data

US 2004/0049521 A1 Mar. 11, 2004

Related U.S. Application Data

(63) Continuation of application No. 09/259,135, filed on Feb. 26, 1999, now abandoned.

(51) Int. Cl.
*G06F 17/00* (2006.01)
(52) U.S. Cl. .................. 707/101; 707/102; 707/104.1
(58) Field of Classification Search .................. 707/100, 707/101, 102, 104.1; 713/168, 170; 714/799; 380/54; 382/115
See application file for complete search history.

(56) References Cited

U.S. PATENT DOCUMENTS

| | | | |
|---|---|---|---|
| 4,145,568 A | 3/1979 | Ehrat | |
| 4,264,782 A | 4/1981 | Konheim | |
| 4,575,621 A | 3/1986 | Dreifus | |
| 4,706,189 A | 11/1987 | Brockman | |
| 5,005,200 A | 4/1991 | Fischer | |

(Continued)

FOREIGN PATENT DOCUMENTS

EP    0386867 A1    9/1990

(Continued)

OTHER PUBLICATIONS

Kelsey et al, "An Authenticated Camera", IEEE 1996, pp. 24-30.*

(Continued)

*Primary Examiner*—Uyen Le
(74) *Attorney, Agent, or Firm*—Sonnenschein Nath & Rosenthal LLP

(57) ABSTRACT

The digital file management and imaging system and method of the present invention record additional independent data with each stored image including: a "true date" which is gleaned from a secure clock which is not settable by the user (the Authentidate™); a number derived from a cyclic redundancy code (CRC) algorithm against the image data; this number is called the "image CRC"; and a CRC derived from the "true date", called the "date CRC". This additional data is recorded within each digital file as soon as possible after the file is acquired. If the file is altered in any way after the recording of the additional data, recalculation of the image CRC on the altered file will not match the original image CRC recorded within it. Thus, the fact that it has been altered can be detected. Likewise, if the true date is altered in any way, recalculation of the date CRC will similarly reveal this fact. The image and date CRCs can be checked and verified at any time. If the recalculated value matches the recorded value, it can be stated that the image presently recorded was recorded on the specified date and has not been altered in any way since then.

23 Claims, 8 Drawing Sheets

U.S. PATENT DOCUMENTS

| | | | |
|---|---|---|---|
| 5,018,196 A | 5/1991 | Takaragi et al. | |
| 5,022,080 A | 6/1991 | Durst et al. | |
| 5,023,908 A | 6/1991 | Weiss | |
| 5,027,297 A | 6/1991 | Garitty et al. | |
| 5,031,214 A | 7/1991 | Dziewit et al. | |
| 5,050,212 A | 9/1991 | Dyson | |
| 5,077,666 A | 12/1991 | Brimm et al. | |
| 5,136,646 A | 8/1992 | Haber et al. | |
| 5,150,407 A | 9/1992 | Chan | |
| 5,157,726 A * | 10/1992 | Merkle et al. | 713/176 |
| 5,186,498 A | 2/1993 | Dietrich | |
| 5,214,702 A | 5/1993 | Fischer | |
| 5,216,724 A | 6/1993 | Suzuki et al. | |
| 5,243,652 A | 9/1993 | Teare et al. | |
| 5,299,026 A | 3/1994 | Vincett et al. | |
| 5,315,504 A | 5/1994 | Lemble | |
| 5,319,562 A | 6/1994 | Whitehouse | |
| 5,339,361 A | 8/1994 | Schwalm et al. | |
| 5,347,579 A | 9/1994 | Blandford | |
| 5,347,580 A | 9/1994 | Molva et al. | |
| 5,351,302 A * | 9/1994 | Leighton et al. | 380/30 |
| 5,367,573 A | 11/1994 | Quimby | |
| 5,371,796 A | 12/1994 | Avarne | |
| 5,373,561 A * | 12/1994 | Haber et al. | 713/157 |
| 5,422,953 A * | 6/1995 | Fischer | 713/172 |
| 5,444,780 A | 8/1995 | Hartman, Jr. | |
| 5,467,342 A | 11/1995 | Logston et al. | |
| 5,471,631 A | 11/1995 | Beardsley et al. | |
| 5,530,851 A | 6/1996 | Fortier | |
| 5,544,322 A | 8/1996 | Cheng et al. | |
| 5,555,307 A | 9/1996 | Le Corre et al. | |
| 5,579,393 A * | 11/1996 | Conner et al. | 713/176 |
| 5,602,933 A | 2/1997 | Blackwell et al. | |
| 5,613,012 A * | 3/1997 | Hoffman et al. | 382/115 |
| 5,619,571 A | 4/1997 | Sandstrom et al. | |
| 5,629,980 A | 5/1997 | Stefik et al. | |
| 5,638,446 A | 6/1997 | Rubin | |
| 5,646,997 A | 7/1997 | Barton | |
| 5,659,616 A | 8/1997 | Sudia | |
| 5,673,316 A | 9/1997 | Auerbach et al. | |
| 5,687,236 A | 11/1997 | Moskowitz et al. | |
| 5,721,724 A | 2/1998 | Taira et al. | |
| 5,739,864 A | 4/1998 | Copeland | |
| 5,742,685 A | 4/1998 | Berson et al. | |
| 5,748,740 A | 5/1998 | Curry et al. | |
| 5,751,809 A | 5/1998 | Davis et al. | |
| 5,765,152 A | 6/1998 | Erickson | |
| 5,765,176 A | 6/1998 | Bloomberg | |
| 5,781,629 A | 7/1998 | Haber et al. | |
| 5,787,175 A | 7/1998 | Carter | |
| 5,787,178 A | 7/1998 | Schwenk | |
| 5,790,790 A | 8/1998 | Smith | |
| 5,828,751 A | 10/1998 | Walker et al. | |
| 5,835,896 A | 11/1998 | Fisher et al. | |
| 5,844,555 A | 12/1998 | Menaker et al. | |
| 5,867,821 A | 2/1999 | Ballantyne et al. | |
| 5,875,249 A | 2/1999 | Mintzer et al. | |
| 5,883,956 A | 3/1999 | Le et al. | |
| 5,884,288 A | 3/1999 | Chang et al. | |
| 5,892,900 A | 4/1999 | Ginter et al. | |
| 5,898,830 A | 4/1999 | Wesinger, Jr. et al. | |
| 5,912,974 A | 6/1999 | Holloway et al. | |
| 5,923,763 A | 7/1999 | Walker et al. | |
| 5,930,796 A | 7/1999 | Pierce et al. | |
| 5,936,149 A | 8/1999 | Fischer | |
| 5,948,103 A | 9/1999 | Fukuzaki | |
| 5,949,879 A | 9/1999 | Berson et al. | |
| 5,956,404 A | 9/1999 | Schneier et al. | |
| 5,958,051 A | 9/1999 | Renaud et al. | |
| 5,963,952 A | 10/1999 | Smith | |
| 5,982,506 A | 11/1999 | Kara | |
| 6,005,945 A | 12/1999 | Whitehouse | |
| 6,021,491 A | 2/2000 | Renaud | |
| 6,058,383 A | 5/2000 | Narasimhalu et al. | |
| 6,070,177 A | 5/2000 | Kao et al. | |
| 6,072,870 A | 6/2000 | Nguyen et al. | |
| 6,076,080 A | 6/2000 | Morscheck et al. | |
| 6,085,320 A | 7/2000 | Kaliski, Jr. | |
| 6,085,321 A | 7/2000 | Gibbs et al. | |
| 6,091,835 A * | 7/2000 | Smithies et al. | 382/115 |
| 6,101,602 A * | 8/2000 | Fridrich | 713/176 |
| 6,105,012 A | 8/2000 | Chang et al. | |
| 6,105,137 A | 8/2000 | Graunke et al. | |
| 6,111,953 A | 8/2000 | Walker et al. | |
| 6,122,372 A | 9/2000 | Hughes | |
| 6,134,327 A | 10/2000 | Van Oorschot | |
| 6,134,550 A | 10/2000 | Van Oorschot et al. | |
| 6,134,597 A | 10/2000 | Rieth et al. | |
| 6,145,079 A | 11/2000 | Mitty et al. | |
| 6,154,753 A | 11/2000 | McFarland | |
| 6,157,721 A | 12/2000 | Shear et al. | |
| 6,158,003 A | 12/2000 | Kara | |
| 6,158,007 A | 12/2000 | Moreh et al. | |
| 6,161,181 A | 12/2000 | Haynes, III et al. | |
| 6,163,841 A | 12/2000 | Venkatesan et al. | |
| 6,167,523 A | 12/2000 | Strong | |
| 6,175,921 B1 | 1/2001 | Rosen | |
| 6,182,219 B1 | 1/2001 | Feldbau et al. | |
| 6,185,682 B1 | 2/2001 | Tang | |
| 6,185,683 B1 | 2/2001 | Ginter et al. | |
| 6,188,766 B1 | 2/2001 | Kocher | |
| 6,189,096 B1 | 2/2001 | Haverty | |
| 6,199,052 B1 | 3/2001 | Mitty et al. | |
| 6,199,055 B1 | 3/2001 | Kara et al. | |
| 6,219,669 B1 | 4/2001 | Haff et al. | |
| 6,237,096 B1 | 5/2001 | Bisbee et al. | |
| 6,240,414 B1 | 5/2001 | Beizer et al. | |
| 6,253,322 B1 | 6/2001 | Susaki et al. | |
| 6,260,021 B1 | 7/2001 | Wong et al. | |
| 6,260,024 B1 | 7/2001 | Shkedy | |
| 6,266,683 B1 | 7/2001 | Yehuda et al. | |
| 6,269,399 B1 | 7/2001 | Dyson et al. | |
| 6,272,506 B1 | 8/2001 | Bell | |
| 6,279,042 B1 | 8/2001 | Ouchi | |
| 6,327,578 B1 | 12/2001 | Linehan | |
| 6,327,656 B2 | 12/2001 | Zabetian | |
| 6,332,193 B1 | 12/2001 | Glass et al. | |
| 6,343,284 B1 | 1/2002 | Ishikawa et al. | |
| 6,345,360 B1 | 2/2002 | Kamada et al. | |
| 6,367,013 B1 | 4/2002 | Bisbee et al. | |
| 6,373,974 B2 | 4/2002 | Zeng | |
| 6,381,695 B2 | 4/2002 | Kudo et al. | |
| 6,381,696 B1 | 4/2002 | Doyle | |
| 6,385,596 B1 | 5/2002 | Wiser et al. | |
| 6,393,566 B1 | 5/2002 | Levine | |
| 6,418,457 B1 | 7/2002 | Schmidt et al. | |
| 6,442,571 B1 | 8/2002 | Haff et al. | |
| 6,453,327 B1 | 9/2002 | Nielson | |
| 6,466,671 B1 | 10/2002 | Maillard et al. | |
| 6,470,449 B1 | 10/2002 | Blandford | |
| 6,530,023 B1 | 3/2003 | Nissl et al. | |
| 6,584,565 B1 | 6/2003 | Zamek | |
| 6,587,945 B1 * | 7/2003 | Pasieka | 713/176 |
| 6,601,172 B1 | 7/2003 | Epstein | |
| 6,640,301 B1 | 10/2003 | Ng | |
| 6,655,585 B2 | 12/2003 | Shinn | |
| 6,711,679 B1 | 3/2004 | Guski et al. | |
| 6,735,694 B1 | 5/2004 | Berstis et al. | |
| 6,745,327 B1 | 6/2004 | Messing | |
| 6,804,705 B2 | 10/2004 | Greco et al. | |
| 6,813,358 B1 | 11/2004 | Di Crescenzo et al. | |
| 6,839,879 B1 | 1/2005 | Hwang | |
| 6,898,709 B1 | 5/2005 | Teppler | |
| 7,007,166 B1 | 2/2006 | Moskowitz et al. | |

| | | | |
|---|---|---|---|
| 7,017,046 B2 | 3/2006 | Doyle et al. | |
| 7,039,805 B1 | 5/2006 | Messing | |
| 7,047,415 B2 | 5/2006 | Doyle et al. | |
| 7,233,948 B1* | 6/2007 | Shamoon et al. | 707/9 |
| 2001/0032314 A1* | 10/2001 | Ansper et al. | 713/176 |
| 2001/0037454 A1 | 11/2001 | Botti et al. | |
| 2002/0007453 A1 | 1/2002 | Nemovicher | |
| 2002/0023220 A1 | 2/2002 | Kaplan | |
| 2002/0029249 A1 | 3/2002 | Campbell et al. | |
| 2002/0055942 A1 | 5/2002 | Reynolds | |
| 2002/0091782 A1 | 7/2002 | Benninghoff, III | |
| 2002/0091927 A1 | 7/2002 | Wall | |
| 2002/0144154 A1 | 10/2002 | Tomkow | |
| 2003/0172120 A1 | 9/2003 | Tomkow et al. | |
| 2003/0177357 A1 | 9/2003 | Chamberlain et al. | |
| 2004/0034780 A1 | 2/2004 | Chamberlain | |
| 2004/0039912 A1 | 2/2004 | Borrowman et al. | |
| 2004/0049521 A1 | 3/2004 | Borrowman | |
| 2004/0117684 A1 | 6/2004 | Chamberlain | |
| 2004/0133524 A1 | 7/2004 | Chamberlain | |
| 2004/0221014 A1 | 11/2004 | Tomkow | |
| 2004/0230657 A1 | 11/2004 | Tomkow | |
| 2004/0255120 A1 | 12/2004 | Botti et al. | |
| 2005/0021480 A1 | 1/2005 | Haff et al. | |
| 2005/0021963 A1 | 1/2005 | Tomkow | |
| 2005/0193075 A1 | 9/2005 | Haff et al. | |
| 2005/0267919 A1 | 12/2005 | Pivar et al. | |
| 2005/0267939 A1 | 12/2005 | Davidson et al. | |
| 2006/0010501 A1 | 1/2006 | Borrowman | |
| 2006/0047762 A1 | 3/2006 | Su et al. | |

FOREIGN PATENT DOCUMENTS

| | | |
|---|---|---|
| EP | 0541281 A2 | 5/1993 |
| EP | 0 788 535 | 11/1997 |
| WO | WO 92/03000 A1 | 2/1992 |
| WO | WO 96/24997 A1 | 8/1996 |
| WO | WO 97/12460 A1 | 4/1997 |
| WO | WO 99/49613 A1 | 9/1999 |

OTHER PUBLICATIONS

Firstuse Online Registry Service, "Time Sealed Registration of Intellectual Property and Importance Records," printed from Firstuse.com (http://www.firstuse.com) on Feb. 26, 1999.

Surety Technologies "Secure Digital Timestamping - Electronic Data Authentication Technology" including "Digital Notary (TM)" printed from Surety Technologies, Inc. (http://www.surety.com) on Feb. 6, 1999.

M. Schneider and S.-F. Chang, "A Robust Content Based Digital Signature for Image Authentication." In Proceedings of the 1996 IEEE International Conference on Image Processing, Lausanne, Switerland, Sep. 1996.

"Digital ID Gives Image Protection", Graphic Arts Monthly, Mar. 1997.

"Digital ID Introduction", Verisign (http://www.verisign.com), 1998.

C. Adams, P. Cain, D. Pinkas, R. Zuccherato, "Time Stamp Protocols", Jun. 4, 1998.

P. Fahn, "Answers to Frequently Asked Questions About Today's Cryptography", RSA Cryptography Today FAQ, Sep. 20, 1993.

C. Adams, P. Cain, D. Pinkas, R. Zuccherato, "Internet Public Key Infrastructure" PKIX Working Group, Jul. 29, 1997.

C. Adams, R. Zuccherato, "Notary Protocols", Feb. 27, 1997.

C. Adams, P. Cain, D. Pinkas, R. Zuccherato, "Time Stamp Protocols", Nov. 7, 1997.

C. Adams, P. Cain, D. Pinkas, R. Zuccherato, "Time Stamp Protocols", Jun. 4, 1998.

B. Blakley, "Architecture for Public Key Infrastructure", Nov. 1996.

C. Adams, P. Cain, D. Pinkas, R. Zuccherato, "Internet Public Key Infrastructure", Jul. 29, 1997.

C. Adams, P. Cain, D. Pinkas, R. Zuccherato, "Internet X.509 Public Key Infrastructure", PKIX Working Group, Sep. 23, 1998.

D. Mills, T. Glassey, M. McNeil, "Authentication Scheme Extensions to NTP", Network Working Group, Sep. 1, 1998.

R. Zuccherato, "Time Stamp Request", Nov. 24, 1998.

J. Litt, "USPS Electronic Postmark", Oct. 17, 1996.

"Fortezza Cryptosecurity Products", Oct. 30, 1996.

"Fortezza Program Overview", Feb. 8, 1996.

"Fortezza Crypto Card", Oct. 28, 1997.

D. Denning, "Descriptions of Key Escrow Systems", Feb. 26, 1997.

M. Henderson, "Smart Cards and PC Cards", Department of Defence, Australia, Feb. 1999.

S. Browne, P. McMahan, D. Powell, "NHSE Distribution of HPCC Software: Legal Issues and Technological Options", Report submitted to the NHSE Technical Committee, Dec. 4, 1996.

"Cryptography's Role In Securing The Information Society", Computer Science and Telecommunications Board, National Research Council, National Academy Press, Washington D.C., 1996.

H. Siegfried, "Non-Repudiation: Constituting Evidence and proof in digital cooperation," Computer Standards and interfaces, Elsevier Sequoia, Lausanne, Ch. Bd. 17, Nr. 1, 1995.

* cited by examiner

DIGITAL FILE MANAGEMENT AND IMAGING SYSTEM AND METHOD INCLUDING SECURE FILE MARKING

CROSS REFERENCE TO RELATED APPLICATIONS

This application is a continuation of U.S. patent application Ser. No. 09/259,135 now abandoned filed Feb. 26, 1999.

FIELD OF THE INVENTION

This invention relates generally to digital imaging systems and more particularly to digital file authentication.

BACKGROUND OF THE INVENTION

Digital imaging is the representation, and storage, of an image or object as a digital raster image. Digital imaging is increasingly used in many industries, partly because of the increased availability of enabling technology and partly due to the many advantages offered over conventional storage methods including: reduced storage space, increased access speed, focused retrievability (e.g., search capabilities), the ability to conveniently make "multiple" and "backup" copies of documents, and the ability to transfer or transmit documents quickly.

In the case of paper document originals, digital imaging systems will typically scan the paper document and store a representation of the scanned document as a digital raster image. An optical scanning device is typically used to scan images of the paper originals for storing as a digital image. The scanned images are exact representations of the original (limited only by the resolution limit of the scanning device), and can include handwriting, signatures, photos, figures, etc. Alternatively, digital images originating from digital cameras, medical imaging devices, or other sources may also be stored in a digital imaging system.

One drawback of known imaging technology is the inherent ability of digital images to be altered, for example, with a purpose to defraud. For example, although an original paper document can be tampered with, such tampering (erasure or additions) will typically leave telltale evidence, digital images of those documents, on the other hand, can be perfectly altered leaving no such evidence. Thus, where the authenticity of an image is critical and may come into question (e.g., legal and medical fields), use of digital images is often not preferred, not acceptable or not admissible and therefore often avoided.

While many different digital image formats are available, in each case, the data is potentially alterable. Even if the digital imaging system does not explicitly provide an editing function, the images can be edited with a third party tool.

A proposed solution is the use of Write-Once, Read-Many ("WORM") optical media to store digital images. One advantage of WORM media storage is that the data it houses is inherently unalterable data can be written only one time to the medium. However, this approach has several disadvantages as well. For example, data recorded on WORM media can be copied from the WORM disk of original recording to re-writable media, altered, and then recorded on new WORM disk with no traceability of such events.

Additionally, although it can be stated with great confidence that data on any one particular WORM disk has not been altered since it was recorded on that disk, the date and time when the data was recorded or whether the data matches an "original" of any kind cannot be determined with any certain or definitive means.

A known advance in file verification technology provides for registration of an "electronic signature" of a digital file (image, word processor document, audio or video clip, etc.). It is known to allow a user to locally select a file and locally run a program provided by a service provider to create an "electronic signature" of the selected digital file based solely on file content. The signature along with a user-provided file name and user-selected keywords are uploaded to He provider's site and stored in a registration database maintained by the service provider under an account established for the particular user. One particular provider generates a "certificate of registration" showing, inter alia, the signature.

Verification of content and submittal date of the digital file at a later time requires going on-line to access the service provider's site and retrieving the prior registration record by file name or keywords. The retrieved database record shows the file signature and the original date that the file signature was registered. To complete verification, the user must run (locally again) the electronic signature program on the file to be verified and compare the regenerated signature to the retrieved registered signature to determine whether the signature of the digital file in question matches that of the originally registered file.

What the user now has is verification that the signature of the file in hand matches the signature of a file which was registered on a particular date.

SUMMARY AND OBJECTS OF THE INVENTION

The foregoing and other problems and deficiencies in image authentication in known digital imaging systems are solved and a technical advance is achieved by the present invention for providing digital file authentication by secure image marking.

In various aspects, it is among the objects of the present invention to provide a system and method for digital file management providing digital file authentication by secure file marking.

A digital file management system in one embodiment of the present invention comprises means for inputting a digital file and a secure date and time reference providing date and time information. A date/time value is generated which is derived from the secure date and time information. An image value is derived from the digital file itself. The digital file is marked with the date and time information, the date/time value and the image value. The marked digital file is then stored.

Alternative embodiments can include such features as generating the date/time value and image value by a cyclic redundancy code algorithm and transforming the date/time value and image value via a mathematical transformation and marking the digital file with the transformed values.

In other embodiments, the secure date and time reference is a local secure clock.

In various embodiments, the digital file can be an image file, a text file or any other file format.

Alternative embodiments of the invention allow for inputting a digital image by way of an optical scanner for scanning an original image into a digital image or directly from digital cameras or medical imaging equipment. The marked digital file can also be stored in optical storage.

BRIEF DESCRIPTION OF THE DRAWINGS

The foregoing and other features and advantages of the present invention will become more apparent in light of the following detailed description of exemplary embodiments thereof, as illustrated in the accompanying drawings, where.

DETAILED DESCRIPTION OF THE DRAWINGS

The following description of the present invention uses for illustrative purposes the Authentidate™ image authentication system incorporated in the turn-key document management and imaging system, DocSTAR™, both of which are available from BitWise Designs, Inc, the assignee of the present invention. While the DocSTAR embodiment of the present invention is geared towards storing, marking and authenticating paper document originals, any digital file can be processed by the method and system of the present invention as will be described. The following discussion with references to the DocSTAR embodiment are in no way intended to be limiting and are made for illustrative purposes only to facilitate explanation and understanding of the present invention.

Figure 1:
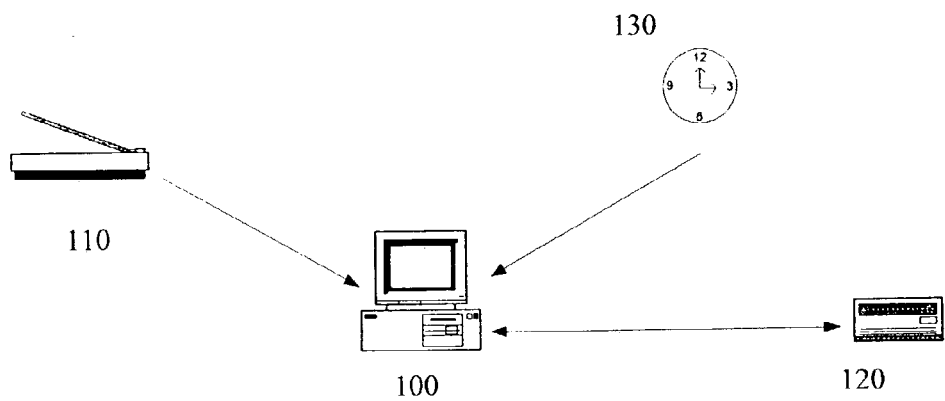
FIG. 1 illustrates a system implementation of the DocSTAR embodiment of the present invention.

FIG. 1 illustrates an exemplary embodiment of the DocSTAR document management and imaging system implementation of the present invention.

A DocSTAR system host 100 is configured in communication with an input device 110, storage device 120 and a secure time and date reference 130.

In this embodiment, system host 100 is implemented as a IBM PC or workstation, input device 110 is an optical scanner, storage device 120 is an optical storage device and the secure time and date reference 130 is provided by a hardware key which incorporates a secure clock.

Original images will be scanned by optical scanner 110. The resulting digital image will be processed by system host 100 according to the method of the present invention which will be discussed in further detail herein, and then stored on optical storage device 120 from where it can be later retrieved.

The image authentication system of the present invention operates in one aspect by recording additional independent data with each stored digital file. These additional data includes: a "true date" which is gleaned from a secure clock (described in further detail below) which is not settable by the user (the Authentidate™); a number derived from a cyclic redundancy code (CRC) algorithm (described in further detail below) against the image data, this number is called the "image CRC"; and a CRC derived from the "true date", called the "date CRC".

These additional data is preferably recorded within each digital file as soon as possible after the image is acquired by the system (from, for example, scanner 110 in the DocSTAR embodiment). As will be discussed in further detail, if the image is altered in any way after the recording of the additional data, recalculation of the image CRC on the altered image will not match the original image CRC recorded within it. Thus, the fact that the image has been altered or is otherwise compromised can be detected. Likewise, if the true date is altered in any way, recalculation of the date CRC will similarly reveal this fact.

The image and date CRCs can be checked and verified at any time. If the recalculated value matches the recorded value, it can be stated with extreme confidence that the image presently recorded was recorded on the specified date and has not been altered in any way since then. No other known system, including paper storage, can offer similar assurance as to the creation date or authenticity of a document.

Figure 2:
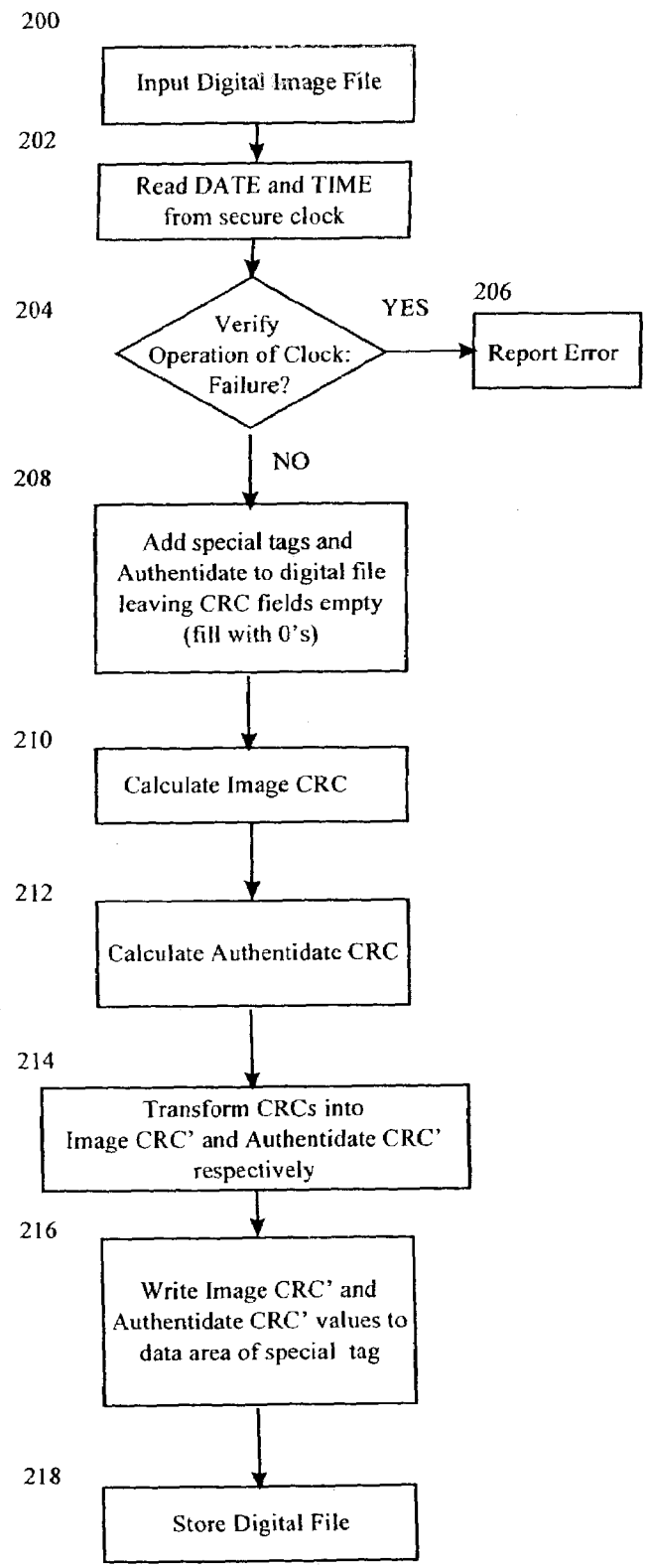
FIG. 2 is a flow chart illustrating the file marking according to one embodiment of the present invention.

With reference to FIG. 2, the operation of the present invention will now be described.

Digital files are first acquired (either retrieved from storage or received from input device 110). (Step 200.) Date and time information is obtained from secure clock 130. (Step 202.) Proper operation of the secure clock is assessed. (Step 204.) If the secure clock is deemed functional, then the date and time data are accepted as read from the clock (in step 202). If a failure of the secure clock is determined, an error indication will be returned and the image processing is halted. (Step 206.) With the clock having been deemed functional (in step 204), special tags (as will be discussed infra) and the Authentidate information (including date and time) are added to the digital file and the CRC data fields are initialized to 0 (i.e., the data fields are filled with 0's). (Step 208.)

Two computed values are then calculated, which are derived from the image content and Authentidate information, respectively. The computed values can be computed in any fashion based on data contained within the digital file which will allow detection of data corruption, such as for example, a standard checksum. In this embodiment of the present invention, cyclic redundancy codes ("CRC"), essentially a more complex checksum calculation, are used to derive the computed values. Any calculation method, however, is acceptable which will provide a number which is derived from the document content data and is suitable for detection of data corruption.

In this embodiment, the computed values are generated by a known CRC algorithm (which will be discussed in further detail below) which is run on both the image content and the Authentidate, creating an Image CRC and an Authentidate CRC, respectively. (Steps 210, 212.) The Image CRC and Authentidate CRC are "transformed" by a proprietary mathematical transformation for added security (as will be discussed infra) creating an Image CRC' and an Authentidate CRC'. (Step 214.)

The image file is then marked with the Image CRC' and Authentidate CRC'. (Step 216.) The marked digital files are stored on optical media by optical storage device 120. (Step 218.)

Figure 3:
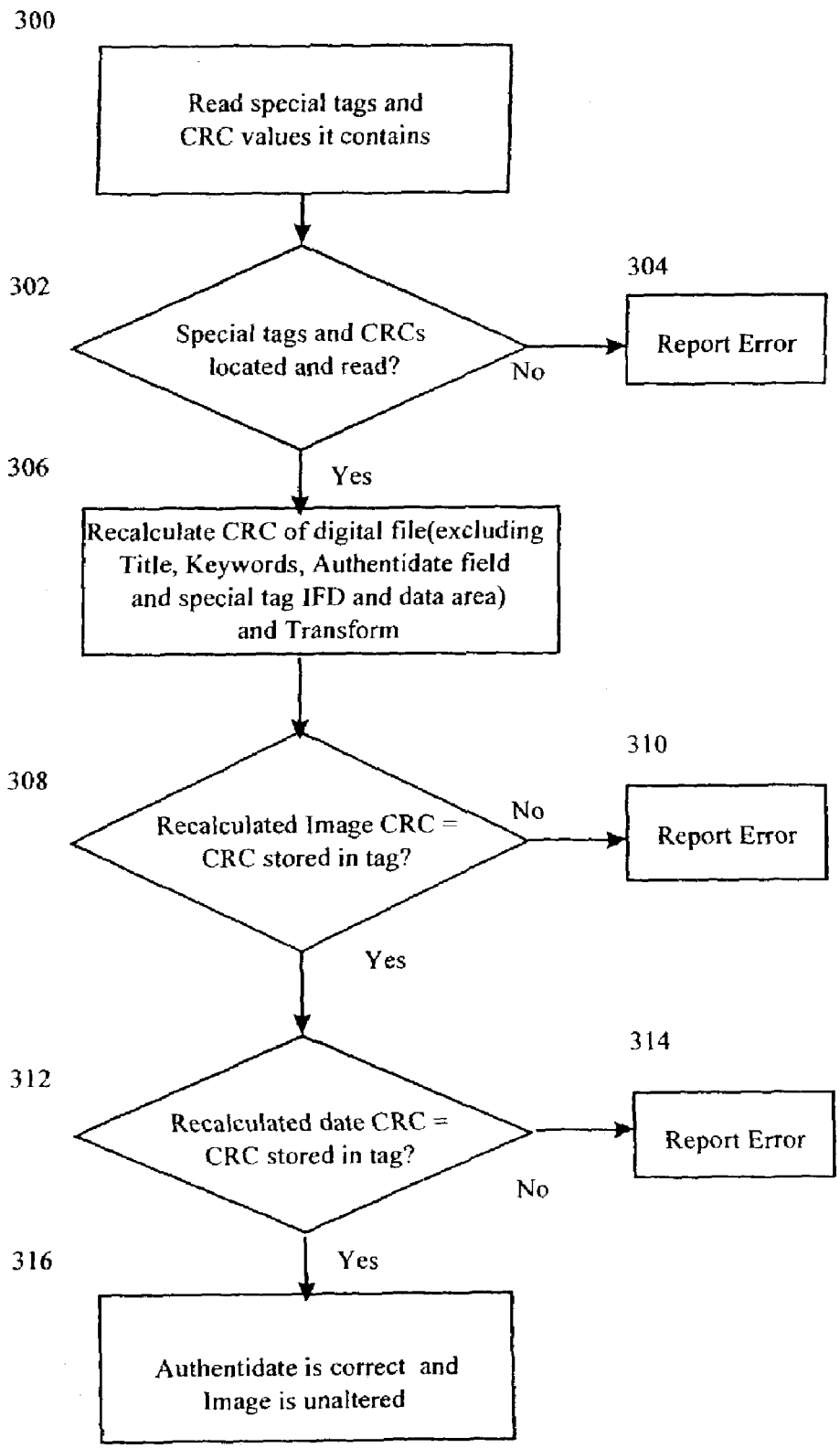
FIG. 3 is a flow chart illustrating validation of the CRCs in a filed marked image according to one embodiment of the present invention.

The authenticity of the image and the time and date stamp can then subsequently be determined by examining the computed values stored within the Digital Files as shown in FIG. 3 which depicts an exemplary flow chart describing one embodiment for validating CRCs in a filed image.

The first step in validating the CRCs in an digital file is to read the special tag and date areas and retrieve the stored image CRC and date CRC values. (Step 300.) If the CRC values cannot be located or read in the digital file (step 302), then, it is determined that either the image has not been properly filed or the image has been altered or is otherwise compromised, and an error is posted. (Step 304.) If the special tags are found, the CRCs are recalculated for the digital file and the date string. (Step 306.) The same algorithms used to calculate the CRCs initially are used to regenerate them at this point. The recalculated image CRC is transformed and compared to the image CRC read from the tag. (Step 308.) (Alternatively, the stored image CRC can be reverse transform prior to comparison to the recalculated value.) If the recalculated digital file CRC does not match the one stored in the special tag, the image is determined to have been altered or otherwise be corrupted and an error is indicated. (Step 310.) If the stored and recalculated image CRCs compare favorably (i.e., they match), the date CRCs are tested. The recalculated date CRC is transformed and compared to the date CRC read from the tag. (Step 312.) (Alternatively, the stored date CRC can be reverse transformed prior to comparison with the recalculated value.) If the recalculated date CRC does not match the one stored in the special tag, the date string is determined to have been altered or be otherwise corrupted and an error is indicated. (Step 314.) If the date CRCs match, at this point both image and date CRCs have compared favorably, the digital file is determined to be unaltered and thus authenticated. (Step 316.)

As will be appreciated from the foregoing description, the use of a secure, non-compromisable clock is fundamental to the present invention. It serves as a secure time and date source which is not alterable by the user. The secure clock maintains the time and date even when the computer is turned off with the aid of a battery backup.

One could use either custom designed hardware or a commercially available product that offers a secure clock. In either case, a mechanism must be in place to prevent fraudulent or arbitrary date/time adjustment.

In the DocSTAR embodiment, a commercially available product that incorporates a secure clock into a physical hardware key is utilized (sometimes called a "dongle"). The hardware key connects to the computer's parallel port and can be accessed through an application programming interface (API) provided by the manufacturer.

The hardware key chosen for use in the DocSTAR embodiment of the present invention is the TIMEHASP-4 available from Aladdin Knowledge Systems, LTD. The security of the hardware key is protected by a custom ASIC chip (Application Specific Integrated Circuit), a unique set of passwords used only by the system provider (for example, BitWise Designs, Inc. the assignee hereof and a "provider" of the DocSTAR system) and advanced protection algorithms and anti-debugging technology in the manufacturer's programming interface and device drivers. This offers a high degree of security for the secure clock.

The current date and time are factory programmed into the secure clock contained within the hardware key during assembly of the DocSTAR Host computer. While any time setting may be used, the secure clock in this embodiment is set to Greenwich Mean Time (GMT) eliminating the need to adjust the clock for different local time zones or for daylight savings time.

Figure 4:
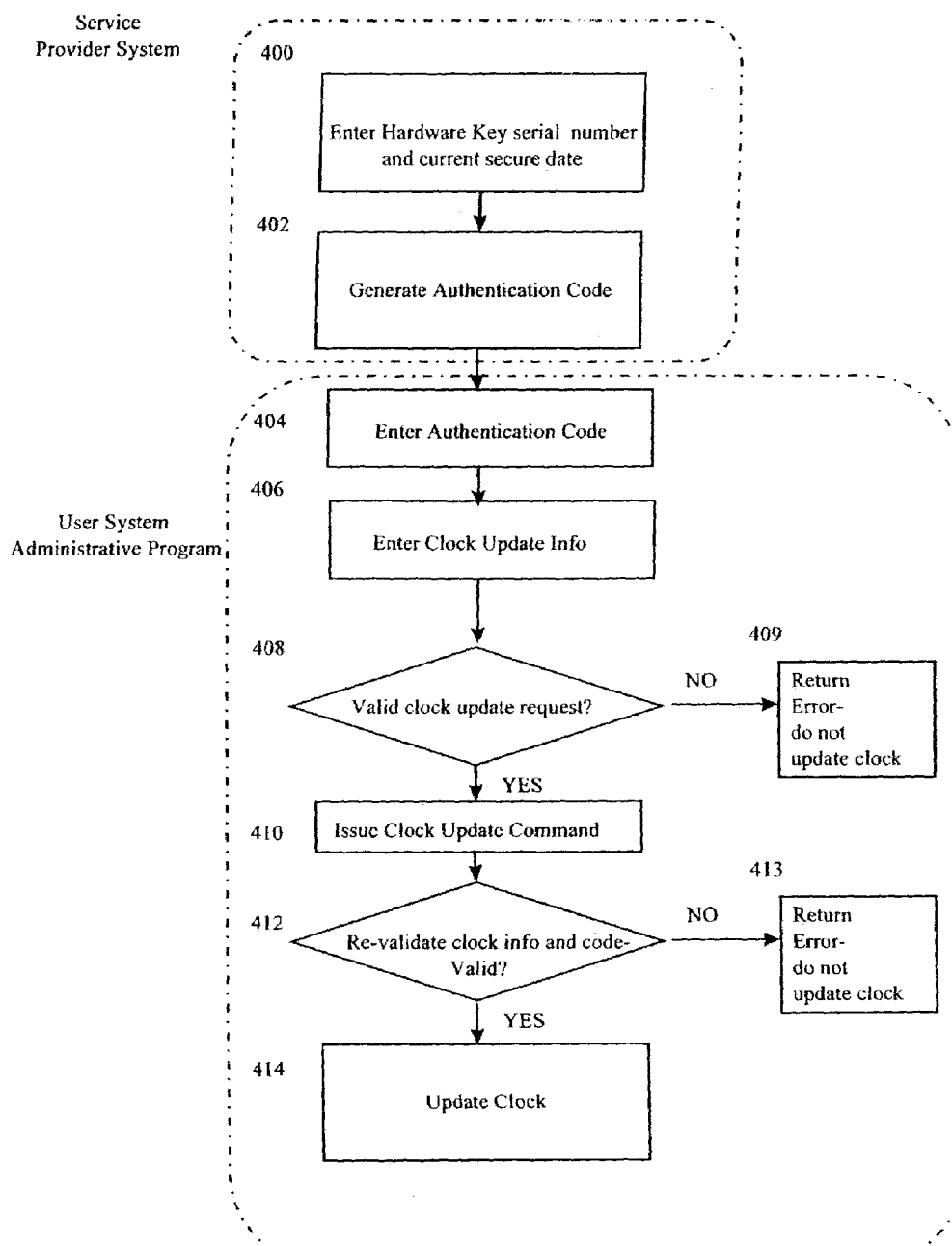
FIG. 4 is a flow chart illustrating one embodiment for setting the secure clock of the present invention.

A mechanism can be incorporated to make adjustments in the clock to reset or correct the clock for slight inaccuracies that can develop over time. For example, in one embodiment as illustrated in FIG. 4, the date and time in the secure clock can be changed by means of a special administration program resident on a user's system which will only allow changes to the secure date and time when the user supplies a proper authentication code supplied by the system provider, such as, for example, the Technical Support department of BitWise Designs, Inc., the assignee hereof. The authentication code will only work to change the secure clock date and time from its current date and time values to the current GMT maintained by the system provider. This prevents the user from altering the secure clock arbitrarily and thereby stamping images with an incorrect or fraudulent date and time.

In this embodiment, an authentication code is required to change the secure clock. To obtain this code, a support technician on the system provider system enters the Hardware Key serial number and the current secure clock date into a secured custom program (the "Eagle Call Tracking System") maintained at BitWise Designs, Inc. (step 400) which will generate an authentication code (step 402). The authentication code will allow the field technician or end user to change the secure clock only to the date and time established and maintained at BitWise Designs, Inc.

The authentication code in this embodiment is determined through a mathematical algorithm which yields one unique code given the current secure clock date, the hardware key serial number, and the desired change to date and time. This authentication code is of limited validity in that it will not work on another day in the future to reset the clock to the date and time on the day the authentication code was given.

The code is entered at the user end. (Step 404.) The desired clock setting is entered at the user end. (Step 406.) The administration program used on the client system allows a small time window (20 minutes) for which any time entered will match the authentication code. Authentication codes are calculated internally for times 5 minutes before and 15 after the given change to time. If the given authentication code matches any of the codes within the time window, the authentication code is deemed correct and implemented. This will allow a field technician to account for several minutes delay while the authentication code is communicated.

Thus the desired setting is validated against the authentication code to determine whether the code will authenticate the date and time change requested. (Step 408.) If invalidity is determined, an error is returned and the clock is not updated. (Step 409.) With a valid request, the actual change to the secure clock will not occur until the Update Clock command is entered at the user end. (Step 410.) This allows a field technician to accurately synchronize the field clock with the clock maintained at BitWise Designs, Inc. After the Update Command is issued, the authentication code is re-validated against the clock information to ensure it is still valid. (Step 412.) If invalidity is determined, an error is returned and the clock is not updated. (Step 413.) The clock is updated. (Step 414).

Alternatively, secure clocks can be reprogrammed by the service provider at the provider's facility (e.g., BitWise Designs, Inc.) by attaching the hardware key directly to a designated Eagle system at BitWise Designs, Inc. and issuing the update secure clock command. The hardware key serial number is verified and the secure clock date and time are updated to GMT date and time maintained at BitWise Designs, Inc.

In further alternative embodiments, clock adjustments to correct for inaccuracies that can develop over time or to set the clock can be implemented as an automated process where a user can cause a clock update from a remote secure clock but the user cannot himself actually set the clock information.

Either the manual or automated method of clock setting and update described above will prevent the user from altering the secure clock arbitrarily and thereby stamping images with an incorrect or fraudulent date and time.

As can be expected within the limits of current available technology, the battery in each clock will eventually fail, or the clock can otherwise become defective over time. These conditions are tested by software prior to image processing to ensure that invalid dates from a defective clock (or dead battery) are not recorded in images, thus compromising the reliability of the image marking. In the event of a clock failure, image filing is disabled until the clock is repaired or replaced.

The computed values mentioned above with reference to FIG. 2, in the DocSTAR embodiment of the present invention are Cyclic Redundancy Codes (CRCs). The CRC is a 32 bit-integer value which represents the result of performing the known CRC-32 algorithm on a block of data. The CRC-32 algorithm is a common, public domain algorithm for detecting even minute changes in data with a variety of applications. For example, CRCs are used in the communications field to verify that data has been transmitted correctly over transmission lines of unknown quality. It is also used to detect corruption of compressed data such as in the popular PKZIP utility. One of the strengths of CRCs is detecting changes to data which might otherwise go undetected. For example, if bit errors occur in a given block of data but their sum is coincidentally the same as that of the original data, this error might go undetected if a standard checksum were to be used. The CRC-32 algorithm would detect this type of change because the resulting code is not simply a sum of the component data as in a standard checksum.

A technical discussion of the CRC-32 algorithm will not be presented here. There are many sources of CRC-32 algorithms and source code in the public domain. Sample C++ source code for a CRC32 algorithm which is implemented in the DocSTAR embodiment of the present invention, is attached as an appendix hereto. As stated earlier, use of the CRC is not required for the present invention per se, and any calculation method is acceptable which will provide a number which is derived from the image data and is suitable for detection of data corruption.

While a CRC value alone may be used a higher level of security can be incorporated into the present invention to ensure the authenticity of an image by addition of a mathematical transformation to the CRC value. As indicated, a typical algorithm to calculate a CRC-32 is in the public domain and thus easily accessible. This fact, in conjunction with the details provided herein, would allow anyone to recalculate the CRC on an altered image, enabling them to counterfeit an "Authentidate" and falsely confirm the image as authentic and unaltered. In the present invention, the actual calculated (image or date) CRC is mathematically transformed to a new value prior to image marking. The functional requirements of the transformation are that the resultant value for any input value is consistent, and that the resultant value is unique for each unique input value. The transformation could, for example, be a permutation of the bit-order of the input, an exclusive OR of the input value with a consistent, predetermined "magic" number, or a combination of these operations.

While the particular transformation technique implemented is not critical, it should be understood that the specific technique used to accomplish the transformation in the practice of this invention should remain confidential to the provider, i.e., a "proprietary transformation technique", as any disclosure or dissemination of the method would likely compromise system security and effectiveness. To give a simple parallel, failure to safeguard the proprietary transformation technique would essentially be the equivalent of password protecting a file and then distributing the password.

Recording information in tags within digital files requires knowledge of the individual digital file formats and the standards governing the structure of their formats. These standards dictate how information will be stored in the file, in what order, using what compression algorithm, etc. Most digital file formats have provisions for accommodating storage of user data in the digital file in addition to the image data. The DocSTAR file management and imaging system embodiment of the present invention uses known TIFF (Tagged Image File) and JPEG (Joint Photographic Experts Group) file formats for storage of (scanned) bitonal and color images, respectively. The standards for TIFF and JPEG image file formats allow for inclusion of user data inside the image file in a manner which does not affect the displayed image. As will be readily understood, the present invention is equally applicable to other file formats which have a mechanism to store user-defined data in the file or the file marked with the user-defined data can be stored in an ancillary file or separate database, for example, for word processing documents, spreadsheets, digitized audio or video or any other digitized file.

The known TIFF format is a file format which allows image data to be stored in a compressed manner along with information about the image (tags) such as compression method used, resolution, size, number of colors, title, date, etc.

A written world-wide standard defines the TIFF file format, what tags must be present, what tags are optional and how specific tags are used. The maintaining organization of the TIFF standard, Adobe Corporation, accepts requests for custom tag numbers for companies developing applications which use tags within the TIFF image. Adobe will assign unique numbers to individual companies to prevent interference between vendors. For example, BitWise Designs, Inc., the assignee hereof, applied for and was assigned its own proprietary tags numbers, other vendors will likewise be assigned their own unique proprietary tag numbers. Use of a custom tag allows storage of a custom data block. The TIFF specification calls for programs to ignore tags that they do not understand and which are not in the baseline specification. This allows common image viewers to view, display and print images which have custom tags because the image files still fit the TIFF specification.

In the case of TIFF image files, the following TIFF image tags are used:

| Tag # | Use |
|-------|-----|
| 10Dh | Document Name |
| 10Eh | Image Description |
| 132h | Date Time |
| 9244h | BitWise DocSTAR Custom Tag 1 |
| | custom data block contains proprietary information including: |
| | Image CRC |
| | Authentidate CRC |

Figure 5:
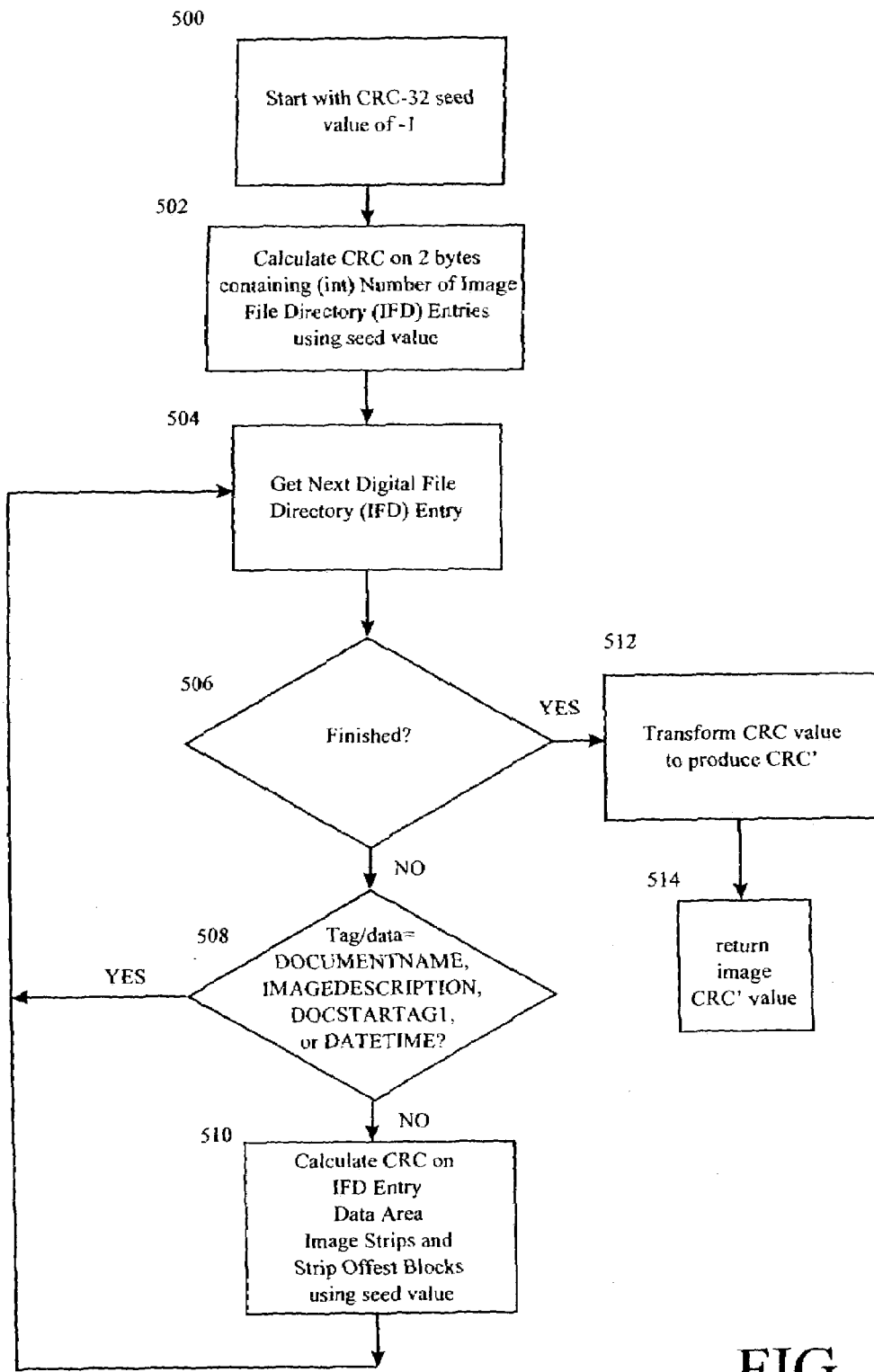
FIG. 5 is a flow chart illustrating calculation of the Image CRC for TIFF format images according to one embodiment of the present invention.

Illustrated in FIG. 5 is an exemplary flow chart demonstrating calculation of an image CRC for a TIFF image file. The calculation of the image CRC for the TIFF image file calls for calculating a CRC-32 on a given block of data using a given 32-bit seed value. The initial seed value is set to −1. (Step 500). The routine works through the format of the TIFF file based on the Image File Directory (IFD) for the file, calculating CRC-32 for each IFD entry and their associated data (step 502) passing results of the prior CRC-32 as the seed to the next (step 510) until all the IFD entries have been cycled through. (Step 506)

All tags and data areas are processed except the following tags and data areas (step 508):

| Tag # | Description |
|---|---|
| 0x010d | TIFFTAG_DOCUMENTNAME |
| 0x010e | TIFFTAG_IMAGEDESCRIPTION |
| 0x0132 | TIFFTAG_DATETIME |
| 0x9244 | TIFFTAG_DOCSTARTAG1 |

After processing all IFD entries for the file (step 506), the proprietary transformation method (as described above) is used to transform the resulting CRC value into a unique and secure value CRC'. (Step 512.) The transformed image CRC value, CRC' is then stored in the image file. (Step 514.)

Figure 6:
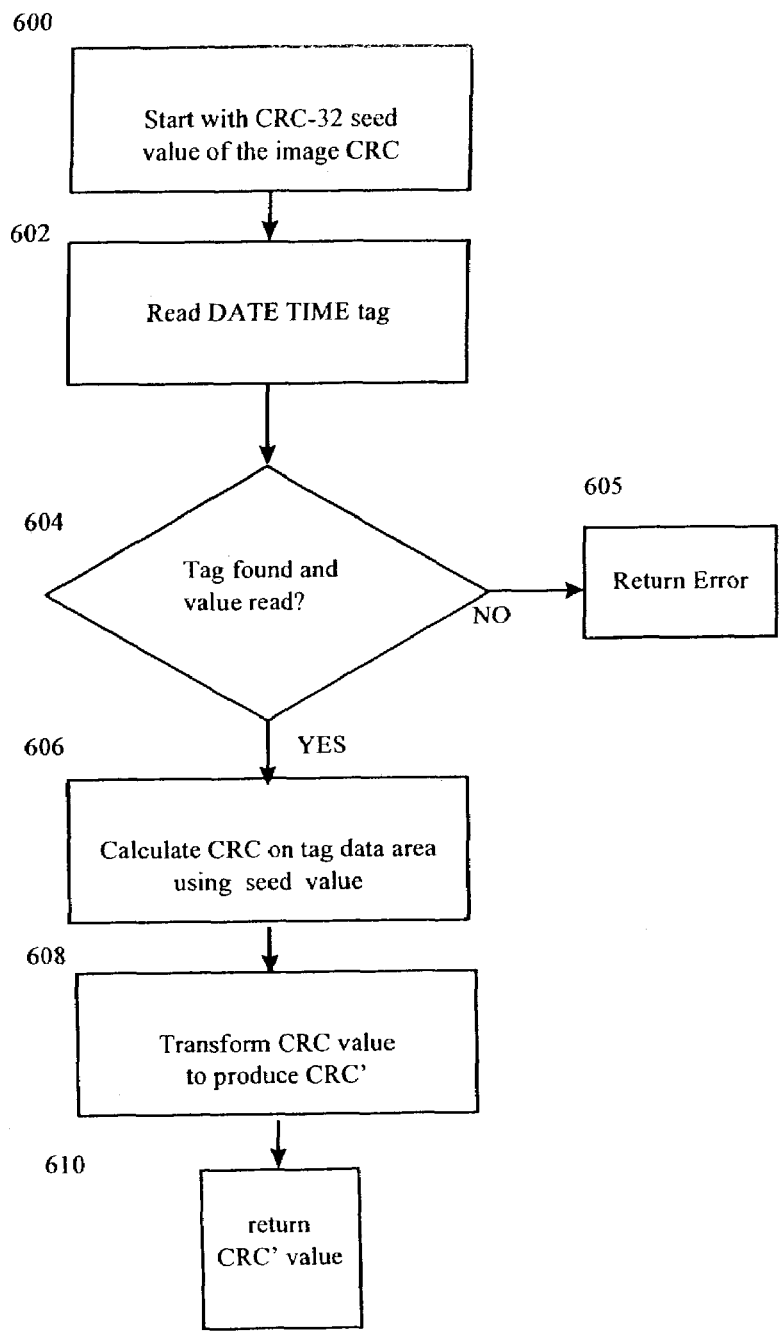
FIG. 6 is a flow chart illustrating calculation of the Date CRC for TIFF format images according to one embodiment of the present invention.

Illustrated in FIG. 6 is an exemplary flow chart demonstrating calculation of a date CRC for a TIFF image file. The calculation of the date CRC for the TIFF image file requires a routine which can calculate a CRC-32 on a given block of data using a given 32 bit seed value. The initial seed value is set to the image CRC value. (Step 600.) The routine reads the 0x0132 TIFFTAG_DATETIME tag. (Step 602.) If the DATETIME tag cannot be found and read (step 604), an error is returned (step 605), otherwise, a CRC-32 is calculated for the data contained within the DATE TIME tag. (Step 606.) The resulting CRC is then transformed into CRC' by means of the proprietary transformation technique (step 608) and stored within the image file. (Step 610.)

The Joint Photographic Experts Group developed the namesake format and maintains the standard for JPEG and the JPG file format (sometimes also called JFIF-JPEG File Image Format). This format was developed for the storage and transmission of photographic images. The compression techniques used are ideally suited to storing subtle differences between color changes, such as a photograph.

As is known, a JPG file is interpreted as a stream of characters with special identifiers called "markers" separating different elements of the image information and image data. The exact meaning of each marker is not important to this discussion except that the JPG standard defines a set of markers to be used by manufacturers for special or proprietary features. These markers are named "APPx" where x is a digit between 0 and 9 inclusive.

The present invention adds a special marker and data block to JPG files when they are stored. In this embodiment, the "APP8" marker will be used for the simple reason that this marker is rarely used by other manufacturers. This marker holds various proprietary information including the following:

Authentidate
Image CRC
Authentidate CRC

Figure 7:
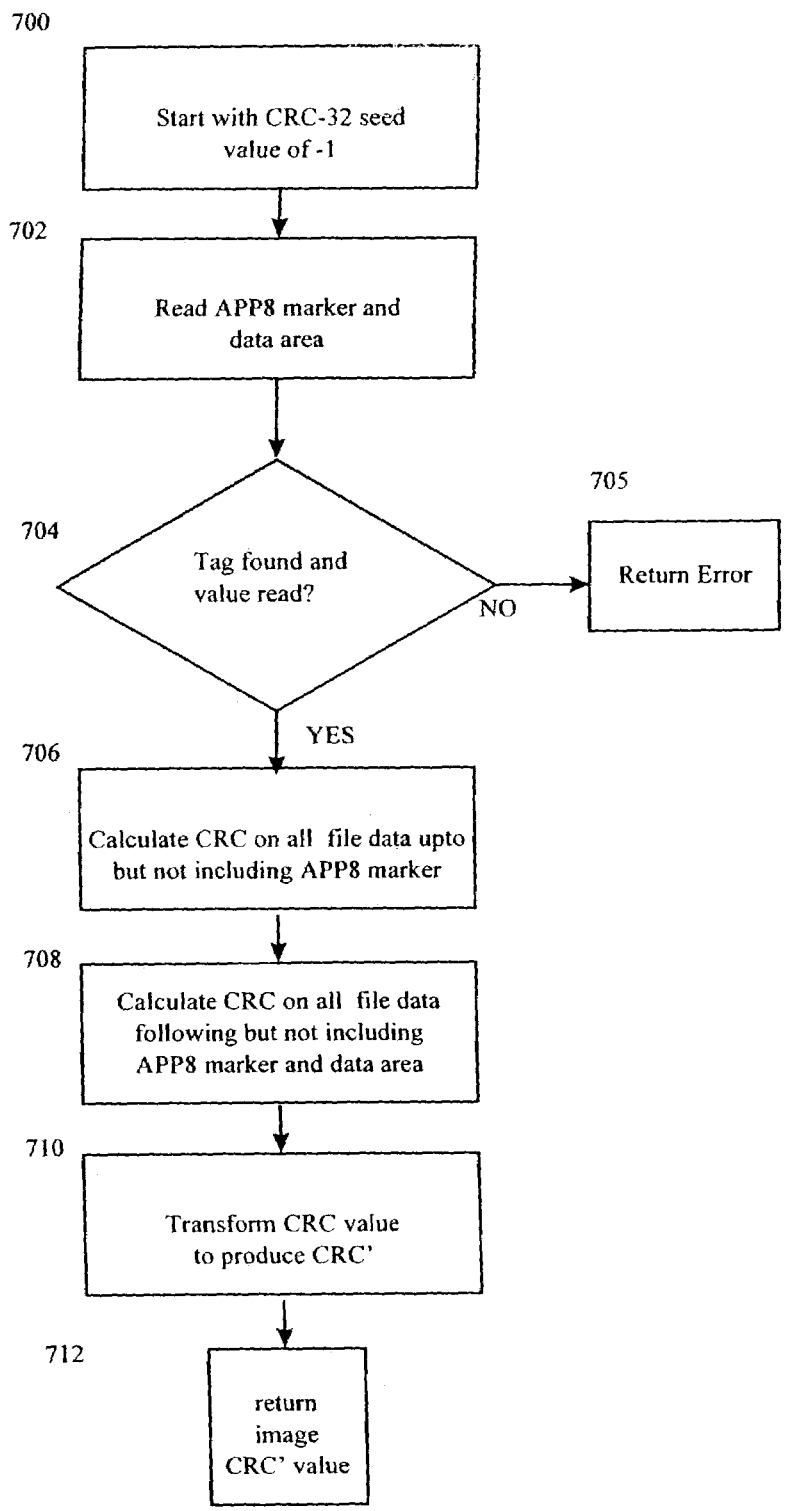
FIG. 7 is a flow chart illustrating calculation of the Image CRC for JPEG format images according to one embodiment of the present invention.

Illustrated in FIG. 7 is an exemplary flow chart demonstrating calculation of an image CRC for a JPEG image file. The calculation of the CRC for the JPEG image file requires a routine which can calculate a CRC-32 on a given block of data using a given 32-bit seed value. The initial seed value is set to −1. (Step 700.) The image file data is read sequentially and the position of the APP8 is determined and read. (Step 702.) If the APP8 marker cannot be found and read (step 704), an error is returned. (Step 705.) A CRC-32 is calculated for all data in the file from the beginning of the file up to but not including the APP8 marker. (Step 706.) The result of this calculation is used as a seed to calculate a CRC-32 on the remainder of the file following the APP8 marker. (Step 708.) The resulting CRC is transformed into CRC' by means of the proprietary transformation technique. (Step 710.) The transformed image CRC' is then stored within the image file. (Step 712.)

Figure 8:
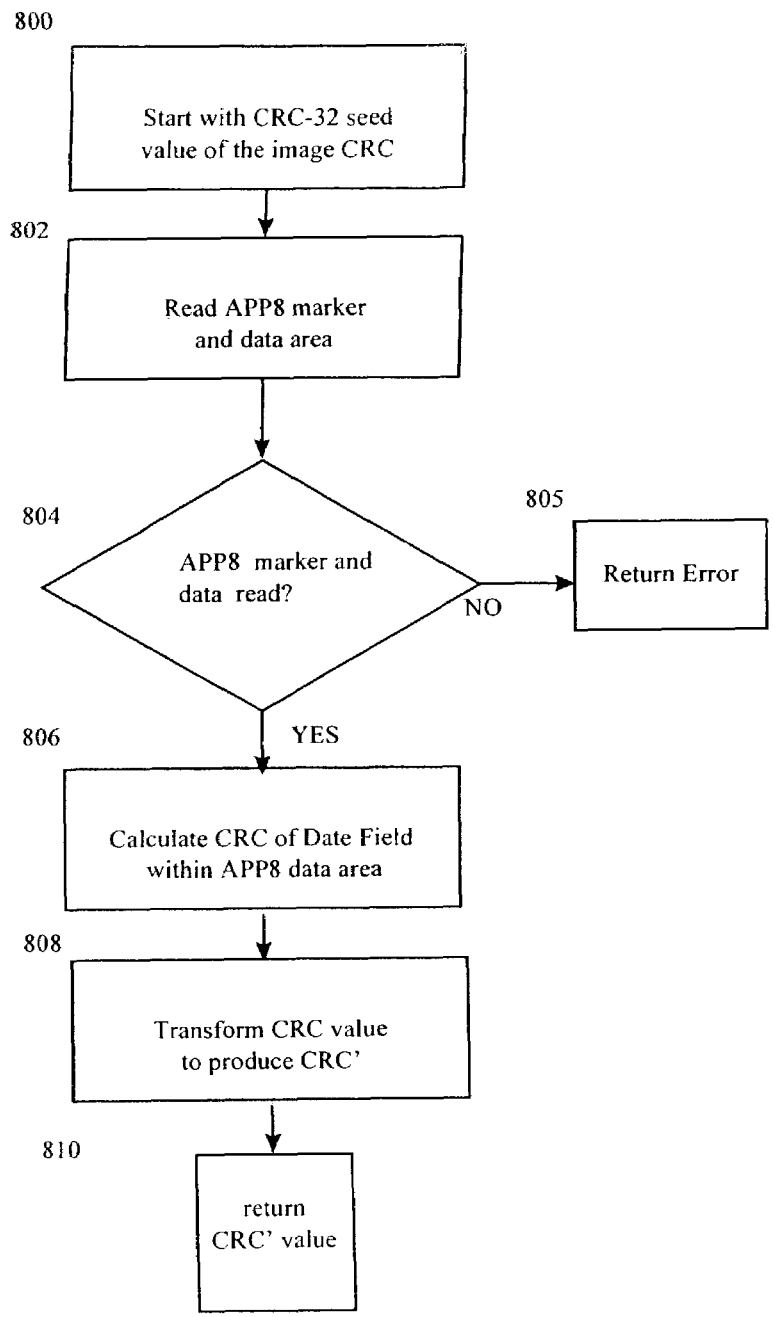
FIG. 8 is a flow chart illustrating calculation of the Date CRC for JPEG format images according to one embodiment of the present invention.

Illustrated in FIG. 8 is an exemplary flow chart demonstrating calculation of a date CRCs for a JPEG image file. The calculation of the CRC for the JPEG image file requires a routine which can calculate a CRC-32 on a given block of data using a given 32-bit seed value. The initial seed value is set to the image CRC value. (Step 800.) The file is read sequentially and the position of the APP8 is determined and read. (Step 802.) If the APP8 marker cannot be found and read (step 804), an error is returned. (Step 805.) A CRC-32 is calculated for the secure data string within the APP8 data area or block. (Step 806.) The resulting CRC is transformed into CRC' by means of the proprietary transformation technique. (Step 808.) The transformed date CRC' is stored within the image file. (Step 810.)

The present invention has been illustrated and described with respect to specific embodiments thereof. It is to be understood, however, that the above-described embodiments are merely illustrative of the principles of the invention and are not intended to be exclusive embodiments. To facilitate discussion of the present invention, paper document originals (e.g., paper, photos, etc.) which are scanned into digital images are presumed in the DocSTAR embodiment of the present invention. However, it should be understood by one skilled in the art, that the present invention will be equally applicable to any digital file regardless of its source or how it is generated, for example, digital images originating from digital cameras, medical imaging devices, word processing or spreadsheet applications or other sources.

Alternative embodiments capturing variations in the enumerated embodiments disclosed herein can be implemented to achieve the benefits of the present invention.

It should further be understood that the foregoing and many various modifications, omissions and additions may be devised by one skilled in the art without departing from the spirit and scope of the invention.

It is therefore intended that the present invention is not limited to the disclosed embodiments but should be defined in accordance with the claims which follow.

I claim:

1. A method of digital file management and imaging comprising:
   providing a digital file;
   providing a date and time from a secure date and time reference from a local source;
   calculating a date/time value from said date and time using a mathematical process;
   generating an image value derived from said digital file;
   marking said digital file with said date and time, said date/time value and said image value; and
   storing said marked digital file.

2. The method of claim 1 wherein the mathematical process is a cyclic redundancy code algorithm.

3. The method of claim 1 wherein generating the image value implements a cyclic redundancy code algorithm.

4. The method of claim 1 further includes transforming the date/time value and marking the digital file with the transformed date/time value.

5. The method of claim 1 further including transforming the image value and marking the digital file with the image value.

6. The method of claim 1 wherein providing a digital file includes optically scanning an original image into a digital image.

7. The method of claim 1 further including recalculating the date/time value and image value and comparing the recalculated values to the date/time and image values respectively which are marked in the image.

8. A digital file management and imaging system comprising:
- means for inputting a digital file;
- a secure date and time reference providing a date and time;
- means for calculating a date/time value derived from said date and time using a mathematical process;
- means for generating an image value derived from said digital file;
- means for marking said digital file with said date and time, said date/time value and said image value; and
- means for storing said marked digital file.

9. The system of claim 1 wherein said secure date and time reference is a local secure clock.

10. The system of claim 1 wherein said means for calculating the date/time value implements a cyclic redundancy code algorithm.

11. The system of claim 1 wherein said means for generating the image value implements a cyclic redundancy code algorithm.

12. The system of claim 1 further including means for transforming the date/time value and wherein said means for marking marks the digital file with the transformed date/time value.

13. The system of claim 12 wherein the mathematical process is a first mathematical process and wherein the means for transforming the date/time value implements a second mathematical process.

14. The system of claim 13 wherein the first mathematical process and the second mathematical process are the same mathematical process.

15. The system of claim 8 further including means for transforming the image value and wherein said means for marking marks the digital file with the transformed image value.

16. The system of claim 15 wherein the mathematical process is a first mathematical process and wherein the means for transforming the image value implements a second mathematical process.

17. The system of claim 16 wherein the first mathematical process and the second mathematical process are the same mathematical process.

18. The system of claim 8 wherein the digital file is an image file.

19. The system of claim 8 wherein the digital file is a text file.

20. The system of claim 8 wherein the digital file is a file from a digital camera.

21. The system of claim 8 wherein the digital file is from a medical imaging device.

22. The system of claim 8 wherein the digital file is a computer application generated file.

23. The system of claim 8 further including means for validating a marked file.

* * * * *